United States Patent Office 2,908,663
Patented Oct. 13, 1959

2,908,663

EPOXIDE-ANHYDRIDE-HYDROXY POLYMER COMPOSITIONS AND METHOD OF MAKING SAME

John E. Masters, Louisville, Ky., assignor to Devoe & Raynolds Company, Inc., a corporation of New York No Drawing. Application March 21, 1957
Serial No. 647,508

13 Claims. (Cl. 260—45.5)

This invention relates to resinous compositions of matter. In one of its aspects, the invention relates to resinous compositions derived from polyepoxides. In another of its aspects, the invention relates to the preparation of such resinous compositions. In still another aspect, the invention relates to film-forming compositions, for example, coating compositions, characterized by good strength, toughness, flexibility and excellent resistance to solvents. Coating compositions of this invention are particularly desirable in the preparation of can coatings, baked-on white enamels for use in household appliances and the like.

The resinous compositions of this invention are prepared by the reaction of selected polyepoxides, polybasic acid anhydrides and certain polyhydroxy copolymers. Polyepoxides contemplated are glycidyl polyethers containing more than one epoxide group per molecule and having epoxide equivalents below one thousand. A preferred polyhydroxy copolymer is a copolymer of a hydroxy ester of an alpha-beta unsaturated acid and a polymerizable compound containing a single double bond. One method of preparing these preferred polyhydroxy copolymers is by reacting the hydroxy ester of the alpha-beta unsaturated carboxylic acid with a compound containing a single active double bond capable of undergoing addition polymerization with the alpha-beta unsaturated carboxylic compound to produce a linear polymer. Another method of preparing the copolymer is by reaction of carboxyl groups of the alpha-beta unsaturated carboxylic acid prior to or after polymerization with a three membered monoepoxide to form an ester with part or all of the carboxyl groups. Still another method of preparing preferred polyhydroxy copolymers is disclosed and claimed in copending application, Serial No. 593,340, filed June 25, 1956.

When a monoepoxide is used in preparing the hydroxy ester one can mix the alpha-beta unsaturated monocarboxylic acid and a suitable catalyst, for example, an amine, and slowly add the monoepoxide at 80° C. to 120° C. with stirring. Or one can prepare the monomeric esters by the slow drop-wise addition of the chloride of the selected alpha-beta unsaturated carboxylic acid such as acrylic acid chloride, into an excess of a selected dihydroxy aliphatic alcohol using heat. A still further method for the preparation of the monomeric esters can be accomplished by introducing a sodium salt of the alpha-beta unsaturated carboxylic acid and an epihalohydrin into a suitable reaction vessel. The ester can then be prepared by hydrolyzing the mixture. A number of other ways in which the monomeric hydroxy esters can be prepared are also available.

When the hydroxy esters are thus prepared by the reaction of carboxyl groups with a saturated compound having a three membered epoxide ring, the epoxy compound is one free of reactive substituents other than hydroxyl groups. Included are oxirane, or ethylene oxide, as well as alkyl oxiranes, for example, methyl oxirane, or propylene oxide, butene-2-oxide, etc. Among others are esters and ethers containing only one three membered epoxide substituent, each free of other reactive groups. Examples are phenyl glycidyl ether, isopropyl glycidyl ether, butyl glycidyl ether, glycidyl benzoate, glycidyl acetate, etc. Hydroxy esters can also be prepared, prior to polymerization, by the use of an alcohol rather than a monoepoxide and the esters can then be copolymerized with a vinyl monomer. Such dihydric alcohols as ethylene glycol, propanediol, butanediol, pentanediol, hexanediol, octanediol, nonanediol, decanediol, and the like are used.

Valuable alpha-beta unsaturated acids for use in the preparation of the copolymer are short chain alpha-beta unsaturated aliphatic monocarboxylic acids such as acrylic, methacrylic, crotonic, undecylenic and the like. By short chain alpha-beta unsaturated acids are intended those of not more than twelve carbon atoms. Also desirable are hydroxy substituted alpha-beta unsaturated aliphatic monocarboxylic acids. Other suitable monocarboxylic acids are half-esters of maleic and fumaric acids formed with saturated monohydric or dihydric alcohols of from one to ten carbon atoms.

It is understood that preferred polyhydroxy polymers are copolymers of (a) alkyl esters of unsaturated monocarboxylic acids having hydroxyl substituents on alkyl groups and (b) monoethylenically unsaturated monomers. The invention thus includes copolymers formed by the polymerization of monounsaturated monocarboxylic acids or their hydroxy esters with other copolymerizable monoethylenically unsaturated monomers group, which undergo addition polymerization to produce linear polymers. Particularly important monoethylenically unsaturated compounds are, for instance, styrene, vinyl toluene, alpha-methyl styrene, the halostyrenes, etc., having a single vinyl group and free of other substituents capable of reacting with an unsaturated acid, i.e., a monofunctional vinyl aromatic compound. Other monoethylenically unsaturated monomers are saturated alcohol esters of acrylic, methacrylic and crotonic acids, the alcohols desirably having not over 10 carbon atoms. Examples of monofunctional vinyl aromatic monomers are isopropenyl toluene, the various dialkyl styrenes, ortho-, meta-, and para-chloro styrenes, bromo styrenes, fluoro styrenes, cyano styrenes, vinyl naphthalene, the various alpha-substituted styrenes, e.g., alpha-methyl styrenes, alpha-methyl para-methyl styrenes, as well as various di-, tri- and tetra-chloro, bromo and fluoro styrenes. Monoethylenically unsaturated acrylic, methacrylic, and crotonic esters of saturated alcohols include the methyl, ethyl, propyl, isopropyl, n-butyl, isobutyl, (sec)butyl, (tert)butyl, amyl, hexyl, heptyl, octyl, decyl, dodecyl, etc. esters of acrylic, methacrylic and crotonic acids. Thus, preferred monomers include monofunctional vinyl aromatic compounds as well as alpha-beta unsaturated monocarboxylic acid esters of saturated monohydric alcohols, the acids having not more than 4 carbon atoms and the alcohols having not more than 20 carbon atoms.

Other known monomers can, of course, be used in the preparation of the copolymer. Desirable monomers include unsaturated aliphatic cyanides of not more than 4 carbon atoms, for example, acrylonitrile and methacrylonitrile, as well as monovinyl ethers, e.g., ethyl vinyl ether, ethyl methallyl ether, vinyl butyl ether, methyl vinyl ether, and others of not over twenty carbon atoms. Included also are unsaturated monohydric alcohol esters of saturated monobasic acids wherein the alcohols contain a single vinyl or vinylene group, preferably of not more than ten carbon atoms, and the acids have not more than twenty carbon atoms, for instance, vinyl acetate, vinyl stearate, and the allyl, methallyl and crotyl esters of propionic, butyric and other acids. Not only the monomers themselves, but mixtures of monomers can be copolymerized with the alpha-beta unsaturated acids to form the carboxyl-containing copolymer. A particularly desirable mixture is a combination of an acrylic or methacrylic ester with styrene or vinyl toluene.

The polymerization of these various monomers and the polymers themselves are known. The polymerization is, of course, accelerated by the use of heat and other conditions such as a peroxide catalyst, e.g., benzoyl peroxide, cumene hydroperoxide, ditertiary butyl peroxide, etc., and is conveniently accomplished in the presence of a solvent or inert diluent such as toluene and the like. In general, the monomeric materials are heated to temperatures up to the boiling point of the monomeric mixture, sometimes using reflux conditions, and the polymerization is effected by conventional methods. Polymerization conditions vary considerably but they are well understood, temperatures of from 15° C. to 130° C. usually being employed, and in some cases, if desired, also a pressure slightly above atmospheric. The polymerization generally is effected by bulk polymerization techniques, preparing polymers containing from 0.5 to 25 percent hydroxyl groups by weight on the polymer.

Referring now to our preferred hydroxyalkyl alkenoate polymers, it is understood that all of the carboxyl groups of the alpha-beta unsaturated acid need not be esterified. It is sufficient to use equivalent amounts of carboxyl compounds and esterifying reactants, or less. The polyhydroxy copolymers employed in accordance with this invention are prepared so that the copolymer contains from twenty-five to ninety percent monoethylenically unsaturated compound based on the copolymer. The remaining ten to seventy-five percent by weight, based on the copolymer, is alpha-beta unsaturated carboxylic acid and/or acid ester, producing a copolymer having a multiplicity of hydroxyl groups per molecule and generally having a hydroxy equivalent of about, say, 150 to about 8000, preferably 160 to 1400.

Referring more specifically to the invention, in one embodiment novel resinous compositions are prepared by the reaction of the polyhydroxy copolymers, generally in solution in a solvent, with a polybasic acid anhydride and a glycidyl polyether containing more than one epoxide group per molecule and having an epoxide equivalent below 1000. Suitable solvents for this purpose are ketones, esters, and ethers. It will be appreciated, of course, that these solvents should be non-reactive with an epoxide or an anhydride; in other words, they should be free of hydroxyl and carboxyl groups. It will also be appreciated that solubility will differ with various members of this group. Desirable solvents are ketones, for example, acetone, methyl ethyl ketone, methyl isobutyl ketone, diisobutyl ketone, etc., and Cellosolve derivatives such as Cellosolve acetate, the diethyl ether of ethylene glycol, and mixtures of ketones and Cellosolve derivatives with aromatic hydrocarbons such as xylene, toluene, benzene, etc. It has been found that an extremely well-cured film is obtained when a solution containing a mixture of the polyhydroxy copolymer, a polybasic acid anhydride and a glycidyl polyether having an epoxide equivalent below 400 is baked. In the preparation of films or coatings it is unnecessary, as in the case of some other uses, to remove the solvent in which the polyhydroxy copolymer is prepared. Thus, when the reactions whereby the polyhydroxy copolymer is made are complete, the polybasic acid anhydride is added and using a suitable inert solvent, the solids content is adjusted to about 60 percent solids. The polyhydroxy copolymer-anhydride solution is then kept at a temperature of, say, 100° C. to 120° C. for about one hour, and is subsequently cooled and blended with the glycidyl polyether which also is in solution in a solvent. Films prepared from the blend are baked at a temperature of from 125° C. to 150° C. for about thirty minutes. The invention thus includes a curable mixture of a glycidyl polyether containing more than one epoxide group per molecule and having an epoxide equivalent below 1000, a polybasic acid anhydride and a polyhydroxy-substituted copolymer of an alpha-beta unsaturated monocarboxylic acid of not more than four carbon atoms and a vinyl monomer having a single active terminal vinyl group, the hydroxyl substituents of the alkoxy groups of said copolymer resulting from esterification of carboxyl groups of the alpha-beta unsaturated acid.

The quantities of glycidyl polyether, polybasic acid anhydride and polyhydroxy copolymer employed in the practice of this invention are probably best expressed as anhydride equivalents of polybasic acid anhydride, hydroxyl equivalents of polyhydroxy copolymer, and epoxide equivalents of glycidyl polyether. The anhydride equivalent represents the weight in grams of the polybasic acid anhydride divided by the functionality of the anhydride, i.e., in the case of dibasic acid anhydrides, one anhydride equivalent represents the molecular weight of the anhydride divided by two. In other words, each mol of dibasic acid anhydride contains two anhydride equivalents, each mol of tetrabasic anhydride contains four anhydride equivalents, etc. By hydroxyl equivalent of polyhydroxy copolymer is intended the weight in grams of the copolymer per hydroxyl group. Thus, two hydroxyl equivalents represent a weight equal to two times the weight per hydroxyl group. In the case of glycidyl polyether the epoxide equivalent represents the weight in grams of the product which contains and is equivalent to one epoxide group. The epoxide equivalent of epoxy compounds is determined by titrating a one gram sample with an excess of pyridine containing pyridine hydrochloride (made by adding 16 cc. of concentrated hydrochloric acid per liter of pyridine) at the boiling point for twenty minutes and back titrating the excess of pyridine hydrochloride with 0.1 N sodium hydroxide using phenolphthalein as indicator, and considering one HCl as equivalent to one epoxide group. Throughout this description the molecular weight of the glycidyl polyether is assumed to be two times the weight per epoxide. Molecular weight determinations can, however, be made by a standard boiling point elevation method. In some cases, the molecular weight values correspond to the theoretical values for a straight chain polymer. In other cases, however, a higher molecular weight value is obtained, seemingly indicating a more complex structure.

The polyhydroxy copolymers contemplated herein are generally prepared by means resulting in products having molecular weights of 500 or 1000 to 20,000 or 30,000, and 4 to 100 hydroxyl groups per linear chain.

It is understood that resinous compositions can be made by the utilization of all of the hydroxyl groups in the polyhydroxy copolymer or cured compositions can be obtained having unreacted hydroxyl groups. Accordingly, it is realized that proportions in which the three reactants are employed vary considerably depending upon whether all of the hydroxyl groups enter the reaction. Generally speaking, the number of epoxide groups should never exceed the number of anhydride groups because if such were the case that portion of the epoxide would be in excess. In other words, it is usually not necessary to use more than one epoxide equivalent for two anhydride equivalents. Proportions of the three reactants will, of course, depend upon uses or properties. As a rule the anhydride and epoxide are employed in an equivalent ratio of 0.5:1 to 4:1, this mixture being reacted with from 5 to 80 percent on the total composition of copolymer, which contains from 0.5 to 13 percent hydroxyl groups by weight.

This invention is applicable to glycidyl polyethers containing more than one epoxide group per molecule and having an epoxide equivalent below 1000, preferably 140 to 250. Desirable glycidyl polyethers are glycidyl polyethers of polyhydric phenols or polyhydric alcohols.

Such glycidyl polyethers are generally produced by the reaction of epihalohydrin or glycerol dihalohydrin with polyhydric phenols or polyhydric alcohols, generally in the presence of a condensing agent, for example, caustic alkali.

Included are polyepoxypolyhydroxy polyethers obtained by reacting epihalohydrin or glycerol dihalohydrin with a mononuclear polyhydric phenol such as resorcinol, hydroquinone, catechol, phloroglucinol, etc., or a polynuclear phenol such as bisphenol (p,p'-dihydroxydiphenyl dimethyl methane), p,p'-dihydroxyphenone, p,p'-dihydroxydiphenyl, p,p'-dihydroxydibenzyl, o,p,o',p'-tetrahydroxydiphenyl dimethyl methane, hematoxylin, polyhydric anthracenes, polyhydric naphthalenes, etc. Bisphenol is particularly advantageous for use in making these glycidyl polyethers. The epihalohydrins can be further exemplified by 3-chloro-1,2-epoxybutane, 3-bromo-1,2-epoxyhexane, 3-chloro-1,2-epoxyoctane, and the like.

The products resulting from the reaction of a polyhydric alcohol or polyhydric phenol with epichlorhydrin or glycerol dichlorhydrin are monomeric and straight chain polymeric products characterized by the presence of more than one terminal epoxide group per chain. Monomeric polyglycidyl polyethers include the glycidyl polyethers of polyhydric phenols obtained by reacting in an alkaline medium a polyhydric phenol with an excess, e.g., 4 to 8 mol excess, of an epihalohydrin. Thus, a polyether which is substantially 2,2-bis(2,3-epoxypropoxyphenyl)propane is obtained by reacting bisphenol, 2,2-bis(4-hydroxyphenyl)propane, with an excess of epichlorhydrin.

One class of straight chain polymeric glycidyl polyethers is produced by the reaction of a polyhydric phenol such as bisphenol with epichlorhydrin or glycerol dichlorhydrin using different proportions of reactants, for example, about 1 mol bisphenol to 1.2 mols epichlorhydrin or glycerol dichlorhydrin to about 1 mol bisphenol to 1.5 mols epichlorhydrin or glycerol dichlorhydrin as set forth in U.S. Patent 2,615,007.

Another group of polymeric glycidyl polyethers is produced by the reaction of a dihydric phenol such as bisphenol with epichlorhydrin in the proportions of about 2 mols of epichlorhydrin to about 1 mol of bisphenol and with the use of caustic alkali in amounts sufficient to combine with the chlorine of the epichlorhydrin. Such glycidyl polyethers are described in U.S. Patent 2,582,985.

Another group of polymeric glycidyl polyethers which can be used in accordance with this invention results from the reaction, generally in alkaline or acid medium, of a polyhydric alcohol or polyhydric phenol with a glycidyl polyether. Examples of such polyepoxypolyhydroxy polyethers obtained by reacting, preferably in an alkaline or an acid medium, a polyhydric alcohol or polyhydric phenol with a polyepoxide such as the reaction product of glycerol and bis(2,3-epoxypropyl)ether, the reaction product of pentaerythritol and 1,2-epoxy-4,5-epoxypentane, the reaction product of resorcinol and bis-(2,3-epoxypropyl)ether, etc. The process for preparing polyepoxypolyhydroxy polyethers of this group is disclosed in U.S. Patent 2,615,008.

As indicated hereinbefore, polyhydric alcohols can be used in the preparation of glycidyl polyethers as well as polyhydric phenols. As set forth in U.S. Patent 2,581,464, these glycidyl polyethers are obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol and the like, subsequently treating the resulting product with an alkaline compound.

The polybasic acid anhydrides useful in preparing the resin compositions of this invention contain one or more anhydride groups. Polybasic acid anhydrides applicable to the invention include both aliphatic and aromatic dicarboxylic acid anhydrides, either saturated or unsaturated, for example, succinic, adipic, maleic, phthalic and pyromellitic anhydrides. Endo-cis-bicyclo-(2,2,1)-5-heptene-2,3-dicarboxylic anhydride (sold under the trademark "Nadic" anhydride), and 1,4,5,6,7,7-hexachlorobicyclo - (2,2,1) - 5 - heptene-2,3 - dicarboxylic anhydride (sold under the trade-mark "Chlorendic" anhydride) are also desirable. Preferred polybasic acid anhydrides are the anhydrides of dicarboxylic acids, preferably phthalic acid anhydrides. The acid anhydrides which are produced by diene syntheses can also be used, for instance, the acid anhydrides which are derived from eleostearic acid-glyceride and maleic acid anhydride, also those of maleic acid anhydride plus terpinene or limonene or other unsaturated hydrocarbons of the terpene series. Other polybasic acids within the contemplation of this invention are anhydrides of glutaric, sebacic, isosuccinic, tetrahydrophthalic, naphthalene-dicarboxylic, diglycolic, hemimellitic, and trimellitic acids.

This invention is not limited to the use of a catalyst. However, improved cures are sometimes obtained thereby. Generally speaking, any of the known catalysts which are activators for epoxide-carboxyl reactions can be used to increase the rate of cure of the compositions, for example, organic bases, tertiary amines and quaternary ammonium hydroxides. Basic catalysts are generally used for this purpose, for example, alkali metal, or alkaline earth metal, hydroxides, and organic bases such as sodium hydroxide, dimethylaminomethyl phenol, and benzyl trimethyl ammonium hydroxide. These alkaline compounds are employed in catalytic quantities, say, from 0.01 to 5 percent.

It is believed that the invention can best be understood by reference to the following examples, some of the hydroxy-containing copolymers used in these examples being prepared in accordance with copending application Serial No. 593,340 by copolymerizing an alpha-beta unsaturated monocarboxylic acid with a monovinyl compound while concomitantly reacting the alpha-beta unsaturated monocarboxylic acid with a monoepoxide to form a hydroxy group. The process is carried out in the presence of solvent, a carboxy-epoxy catalyst, a vinyl polymerization catalyst. The aforementioned reactants are charged into a flask equipped with an agitator, condenser and thermometer, together with solvent (the ratio of solvent to reactants being 1:1 to 0.4:1). As catalysts for the carboxy-epoxy reaction an amine, preferably a tertiary amine, an amine salt or quaternary ammonium hydroxide, etc., are added in amounts of 0.5 to 1.0 percent (based on the weight of the reactants). Peroxides or hydroperoxides, etc., in amounts of 1 to 2 percent (based on the weight of the reactants) are present as copolymerization catalysts. The flask contents are refluxed until the carboxy-epoxy esterification and concomitant polymerization reactions are substantially complete, as indicated by a low acid value, and a solids content approaching the theoretical, reflux time being approximately 10 to 14 hours.

EXAMPLE 1

*Preparation of polyhydroxy-containing copolymer*

A 50/50 styrene/hydroxy propyl acrylate copolymer having a theoretical hydroxyl equivalent of 260 is prepared according to the paragraph preceding these examples from the combination of 22.3 parts of propylene oxide, 27.7 parts of acrylic acid and 50.0 parts of styrene; in the presence of 2.0 parts of benzoyl peroxide and 1.0 part of a 35 percent solution of benzyl trimethyl ammonium hydroxide in methanol as catalyst and 66 parts of methyl isobutyl ketone as solvent. The resulting copolymer solution has a solids content of 58.5 percent as determined by heating a 2 gram portion in an open container for two hours at 150° C. and an acid value of 2.7 based on solids.

Preparation of glycidyl polyether

About 533 parts (2.33 mols) of bisphenol and 204 parts (5.1 mols) of sodium hydroxide (5 percent excess) are combined in 1900 parts of water and heated to about 23° C., whereupon 441 parts (4.76 mols) of epichlorhydrin are added rapidly. The temperature is increased to 90° C.–100° C. over a period of 1 hour and 10 minutes. The mixture is separated into a two phase system and the aqueous layer drawn off. The resinous layer that remains is washed with hot water and is then drained and dried at a temperature of about 140° C. The Durrans' Mercury Method melting point of the resulting product is 40° C.–45° C. and the epoxide equivalent is 340.

Preparation of cured resinous composition

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether; which in this case represents, based on a total of 100 parts, 41.5 parts of the copolymer of this example, 17.8 parts of phthalic anhydride and 40.7 parts of the glycidyl polyether of this example. In the preparation of this resinous composition, 71.0 grams of a 58.5 percent solids solution of the 50/50 styrene/hydroxy propyl acrylate copolymer of this example and 17.8 grams of phthalic anhydride are heated together at 100° C., in a one liter flask equipped with a condenser, thermometer, and agitator until all the phthalic anhydride is in solution, approximately 1 hour. The flask contents are cooled to room temperature, and 54.3 grams of a 75 percent solution of the glycidyl polyether of this example in xylene are blended into the mixture. 106.0 grams of Cellosolve acetate are then added to obtain a 40 percent resinous solution. A 3 mil film of the resulting product is prepared and baked for 30 minutes at 150° C. on a glass panel. The cured film is clear and smooth and has outstanding flexibility, hardness, toughness, and mar resistance properties. The film will resist a 3 percent alkali solution for about 3 to 4 weeks before exhibiting signs of failure. A 4 hour, at 200° C., overbake on the film shows that considerably less discoloration occurs than occurs in conventional alkyd resin films.

EXAMPLE 2

Preparation of glycidyl polyether

A solution consisting of 11.7 parts of water, 1.22 parts of sodium hydroxide and 13.38 parts of bisphenol is prepared by heating the mixture of ingredients to 70° C. and then cooling to 46° C., at which temperature 14.06 parts of epichlorohydrin are added while agitating the mixture. After 25 minutes had elapsed, there is added during an additional 15 minutes time, a solution consisting of 5.62 parts of sodium hydroxide in 11.7 parts of water. This causes the temperature to rise to 63° C. Washing with water at 20° C. to 30° C. temperature is started 30 minutes later and continued for 4 and a half hours. The product is dried by heating to a final temperature of 140° C. in 80 minutes and cooling rapidly. At room temperature, the product is an extremely viscous semi-solid having a melting point of 26° C. by Durrans' Mercury Method and an epoxide equivalent of 270.

Preparation of cured resinous composition

A resinous composition is prepared from a ratio of 4 hydroxyl equivalents of polyhydroxy-containing copolymer to 6 anhydride equivalents of a polybasic acid anhydride to 3 epoxide equivalents of a glycidyl polyether. In this case, these proportions represent, based on a total of 100 parts, 45.3 parts of the copolymer of Example 1, 19.4 parts of phthalic anhydride and 35.3 parts of the glycidyl polyether of this example. A resinous composition is prepared according to the procedure outlined in Example 1 from a blend of 77.5 grams of a 58.5 percent solids solution of the 50/50 styrene/hydroxy propyl acrylate copolymer prepared as in Example 1, 19.4 grams of phthalic anhydride and 41.5 grams of an 85 percent solution of the glycidyl polyether of this example in xylene. To this blend is then added 111.6 grams of Cellosolve acetate to obtain a 40 percent resinous solution. A 3 mil film of the resulting product is prepared on a glass panel and baked for 30 minutes at 200° C. The cured film is clear and smooth and has exceptionally good flexibility, mar resistance, toughness and hardness.

EXAMPLE 3

Preparation of cured resinous composition

A resinous composition is prepared from a ratio of 4 hydroxyl equivalents of a polyhydroxy-containing copolymer to 4 anhydride equivalents of a polybasic acid anhydride to 2 epoxide equivalents of a glycidyl polyether; which in this example represents, based on a total of 100 parts, 51.6 parts of the copolymer of Example 1, 14.7 parts of phthalic anhydride and 33.7 parts of the glycidyl polyether of Example 1. A resinous composition is prepared according to the procedure outlined in Example 1 from a blend of 88.2 grams of a 58.5 percent solids solution of the 50/50 styrene/hydroxy propyl acrylate copolymer of Example 1, 14.7 grams of phthalic anhydride and 44.9 grams of a 75 percent solution of the glycidyl polyether of Example 1 in xylene. To this blend is then added 102.2 grams of Cellosolve acetate to obtain a 40 percent resinous solution. A 3 mil film of the resulting blend is prepared and baked at 150° C. for 30 minutes. The cured film is clear and smooth and possesses outstanding flexibility, toughness, hardness, and mar resistance properties.

EXAMPLE 4

Preparation of polyhydroxy-containing copolymer

A 75/25 styrene/hydroxy propyl acrylate copolymer having a theoretical hydroxyl equivalent of 518 is prepared in accordance with the paragraph preceding these examples by combination of 11.1 parts of propylene oxide, 13.9 parts of acrylic acid and 75.0 parts of styrene in the presence of 1.0 part of benzoyl peroxide and 0.5 part of a 35 percent benzyl trimethyl ammonium hydroxide solution in methanol as catalysts. 66.0 parts of xylene are added as solvent for the process. The resulting polyhydroxy-containing copolymer solution has a solids content of 51.3 percent as determined by heating a 2 gram portion in an open container for 2 hours at 150° C., and an acid value of 1.5 based on solids.

Preparation of cured resinous composition

From the combination of a ratio of 4 hydroxyl equivalents of a polyhydroxy-containing copolymer to 6 anhydride equivalents of a polybasic acid anhydride to 3 epoxide equivalents of a glycidyl polyether, a resinous composition is prepared. These proportions represent in this example, on a parts per hundred basis, 58.1 parts of the copolymer of this example, 12.7 parts of phthalic anhydride and 29.2 parts of the glycidyl polyether of Example 1. Into a one liter flask equipped with stirrer, condenser, and thermometer are charged 113.2 grams of a 51.3 percent solids solution of the 75/25 styrene/hydroxy propyl acrylate copolymer of this example and 12.7 grams of phthalic anhydride. The mixture is heated at 100° C. until all the phthalic anhydride is in solution, approximately 1 hour. The contents of the flask are cooled to room temperature and 38.9 grams of a 75 percent solution of the glycidyl polyether of Example 1 in xylene are then blended into the mixture together with 85.2 grams of Cellosolve acetate to make a 40 percent resinous solution. A 3 mil film of the resulting product is prepared and baked for 30 minutes at 150° C. The cured film exhibits good flexibility, hardness, toughness, and mar resistance properties though all of these properties are slightly inferior to those of Examples 1, 2 and 3.

EXAMPLE 5

*Preparation of polyhydroxy-containing copolymer*

A 65/35 styrene/hydroxy propyl acrylate copolymer having a theoretical hydroxyl equivalent of 421 is prepared in accordance with the paragraph preceding these examples, by combining in the presence of 66.0 parts of xylene and methyl isobutyl ketone as solvents; 15.5 parts of propylene oxide, 19.5 parts of acrylic acid and 65.0 parts of styrene. Benzoyl peroxide (1.0 part) and 0.7 part of benzyl trimethyl ammonium hydroxide (35 percent solution in methanol) catalyze the process. The copolymer solution resulting has a solids content of 52.5 percent as determined by heating a 2 gram portion in an open container for 2 hours at 150° C., and an acid value of less than 1 based on solids.

*Preparation of cured resinous composition*

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether. In this example, these proportions represent, based on a total of 100 parts, 53.5 parts of the copolymer of this example, 14.1 parts of phthalic anhydride and 32.4 parts of the glycidyl polyether of Example 1. According to the procedure described in Example 4, a resinous composition is prepared from a blend of 101.9 grams of a 52.5 percent solids solution of the 65/35 styrene/hydroxy propyl acrylate copolymer of this example, 14.1 grams of phthalic anhydride and 43.2 grams of a 75 percent solution of the glycidyl polyether of Example 1 in xylene. Also present in the blend are 90.8 grams of Cellosolve acetate (sufficient solvent to obtain a 40 percent resinous solution). A 3 mil film of the resulting product is prepared and baked at 150° C. for 30 minutes. The film properties of this cured film are intermediate between those of Example 4 and those of Examples 1, 2 and 3. Flexibility, hardness, toughness, and mar resistance are good.

EXAMPLE 6

*Preparation of polyhydroxy-containing copolymer*

A 25/25/50 styrene/methyl acrylate/hydroxy propyl acrylate copolymer having a theoretical hydroxyl equivalent of 260 is prepared in accordance with the paragraph preceding these examples, from the combination of 22.3 parts of propylene oxide, 27.7 parts of acrylic acid, 25.0 parts of styrene and 25.0 parts of methyl acrylate in the presence of 100 parts of xylene as a solvent; and using 1.0 part of benzoyl peroxide and 1.0 part of benzyl trimethyl ammonium hydroxide (35 percent solution in methanol) as catalysts. The polyhydroxy-containing copolymer solution resulting has a solids content of 43.1 percent as determined by heating a 2 gram portion in an open container for 2 hours at 150° C., and an acid value of 3.7 based on solids.

*Preparation of cured resinous composition*

A resinous composition is prepared from a ratio of 4 hydroxyl equivalents of a polyhydroxy-containing copolymer to 6 anhydride equivalents of a polybasic acid anhydride to 3 expoxide equivalents of a glycidyl polyether; which in this case represents, based on a total of 100 parts, 41.5 parts of the copolymer of this example, 17.8 parts of phthalic anhydride and 40.7 parts of the glycidyl polyether of Example 1. As outlined in Example 4, a resinous composition is prepared from a blend of 96.3 grams of a 43.1 percent solids solution of the 25/25/50 styrene/methyl acrylate/hydroxy propyl acrylate copolymer of this example, 17.8 grams of phthalic anhydride and 54.3 grams of a 75 percent solution of the glycidyl polyether of Example 1 in xylene. To this blend are added 81.6 grams of Cellosolve acetate to adjust the solids content of the solution to 40 percent. A 3 mil film of the resulting product is prepared and baked at 150° C. for 30 minutes. The cured film is clear and smooth and has outstanding flexibility, very good toughness and mar resistance, and good hardness.

EXAMPLE 7

*Preparation of polyhydroxy-containing copolymer*

As outlined in the paragraph preceding these examples, a 50/50 vinyl toluene/hydroxy propyl acrylate copolymer having a theoretical hydroxyl equivalent of 260 is prepared from the combination of 22.3 parts of propylene oxide, 27.7 parts of acrylic acid and 50.0 parts of vinyl toluene; in the presence of 2.0 parts of benzoyl peroxide and 1.0 part of a 35 percent solution of benzyl trimethyl ammonium hydroxide in methanol as catalysts and 67.0 parts of xylene as solvent for the process. The resulting copolymer solution has a solids content of 46.2 percent as determined by heating a 2 gram portion in an open container for 2 hours at 150° C. and an acid value of less than 1 based on solids.

*Preparation of cured resinous composition*

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether. In this case, these proportions represent, based on a total of 100 parts, 41.5 parts of the 50/50 vinyl toluene/hydroxy propyl acrylate copolymer of this example, 17.8 parts of phthalic anhydride and 40.7 parts of the glycidyl polyether of Example 1. A resinous composition is prepared in accordance with the procedure outlined in Example 4, from a blend of 90 grams of the 46.2 percent solids solution of the 50/50 vinyl toluene/hydroxy propyl acrylate copolymer of this example, 17.8 grams of phthalic anhydride and 54.3 grams of a 75 percent solution of the glycidyl polyether of Example 1 in xylene. Included as solvent in the blend are 87.9 grams of methyl isobutyl ketone, added to obtain a 40 percent resinous solution. A 3 mil film of the resulting product is prepared and cured by baking at 150° C. for 30 minutes. The cured film is clear and smooth and is exceptionally flexible, hard, tough, and mar resistant. The film is resistant to a 3 percent alkali solution up to 3 to 4 weeks before any evidence of failure.

EXAMPLE 8

Gel times are determined for various ratios of copolymer to anhydride to glycidyl polyether, the number of anhydride equivalents always being two times the number of epoxide equivalents. A long gelation period is indicative of a very slow curing time. Some of these ratios, using the coplymer and the glycidyl polyether of Example 7, are shown in the following table.

| Copolymer—Hydroxyl Equivalents | Phthalic—Anhydride Equivalents | Glycidyl Polyether Of Example 1—Epoxide Equivalents | Temperature, ° C. | Gel Time |
| --- | --- | --- | --- | --- |
| 1.0 | 2.0 | 1.0 | 120 | 12 minutes. |
| 1.0 | 1.6 | 0.8 | 120 | Do. |
| 1.0 | 1.2 | 0.6 | 120 | 13 minutes. |
| 1.0 | 1.0 | 0.5 | 120 | Do. |
| 1.0 | 0.5 | 0.25 | 120 | 14 minutes. |
| 1.0 | 0.25 | 0.125 | 120 | 17 minutes. |
| 1.0 | 0.125 | 0.0625 | 120 | 20 minutes. |
| 1.0 | 0.0625 | 0.03125 | 120 | 45 minutes. |
| 1.0 | 0.03125 | 0.015625 | 120 | 20 hours. |

EXAMPLE 9

*Preparation of cured resinous composition*

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether. In this example, these proportions represent, based on a total of 100 parts, 41.8 parts of a 50/50 vinyl toluene/hydroxy propyl acrylate copolymer of Example 7, 19.8 parts of endo-cis-bicyclo-(2,2,1)-5-heptene-2,3-dicarboxylic anhydride, sold under the trade-mark "Carbic" anhydride, and 38.4 parts of glycidyl polyether prepared as in Example 1, but having an epoxide equivalency of 318. In accordance with the procedure outlined in Example 4, a resinous composition is prepared by blending 76.5 grams of a 50/50 vinyl toluene/hydroxy propyl acrylate copolymer solution of Example 7 (as a 54.7 percent solids solution), 19.8 grams of the aforementioned anhydride, and 51.2 grams of the glycidyl polyether of Example 1 (epoxide equivalency of 318) as a 75 percent solution in xylene. To this blend are added as solvents, 102.5 grams of a 50/50 mixture of xylene and methyl isobutyl ketone to obtain a 40 percent resinous solution. A 3 mil film of the resulting blend is prepared and cured by baking for 30 minutes at 150° C. The cured film is clear and smooth, exceptionally hard, flexible, tough and mar resistant.

EXAMPLE 10

*Preparation of cured resinous composition*

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether; which in this example represents, based on a total of 100 parts, 33.4 parts of a 50/50 vinyl toluene/hydroxy propyl acrylate copolymer of Example 7, 35.9 parts of 1,4,5,6,7,7 - hexachlorobicyclo - (2,2,1)-5-heptene - 2,3-dicarboxylic anhydride (sold under the trade-mark "Het") and 30.7 parts of the glycidyl polyether of Example 1 but having an epoxide equivalency of 318. A resinous composition results from the combination of 61.1 grams of a 54.7 percent copolymer solution of the 50/50 vinyl toluene/hydroxy propyl acrylate of Example 7, with 35.9 grams of the aforementioned anhydride in a 1 liter flask equipped with condenser, agitator and thermometer. The contents of the flask are heated until all the anhydride is in solution. After cooling to room temperature, 40.9 grams of a 75 percent solution of the glycidyl polyether of Example 1 (epoxide equivalency of 318) in xylene, is blended into the mixture, and in addition a 50/50 mixture of methyl isobutyl ketone and xylene totaling 112.1 grams is added. From the resulting 40 percent resinous solution, a 3 mil film is prepared and cured by baking at 150° C. for 30 minutes. The cured film is clear and smooth and possesses outstanding flexibility, hardness, toughness, and mar resistance.

EXAMPLE 11

*Preparation of glycidyl polyether*

In a flask equipped with a stirrer, condenser, and thermometer are placed 330 grams (3 mols) of resorcinol and 2775 grams (30 mols) of epichlorhydrin in 27 grams of water. To this mixture 250 grams of sodium hydroxide flakes are added slowly in 2 additions. First 165 grams are added and the flask is slowly heated. When the temperature reaches 105° C., heat is withdrawn and the mixture is cooled in a water bath. When the temperature of the mixture decreases to 100° C., an additional 85 grams of sodium hydroxide are added, the mixture being continuously cooled because of the exothermic reaction. After the exotherm subsides, the material is distilled to remove the water. The flask is then cooled, 1000 cc. of benzene added, and the product filtered to remove the sodium chloride. The excess epichlorhydrin and other volatile matter are removed under vacuum. A pale amber, viscous liquid having an epoxide equivalent of 148 is obtained.

*Preparation of cured resinous composition*

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether; which in this case represents, based on a total of 100 parts, 54.0 parts of the 50/50 vinyl toluene/hydroxy propyl acrylate copolymer of Example 7 (hydroxyl equivalent of 260), 23.0 parts of phthalic anhydride and 23.0 parts of the glycidyl polyether of this example (epoxide equivalent of 148). In the preparation of a resinous composition according to the procedure of Example 10, a blend of 116.9 grams of the 46.2 percent solids solution of 50/50 vinyl toluene/hydroxy propyl acrylate copolymer of Example 7, 23.0 grams of phthalic anhydride and 30.7 grams of a 75 percent solution of the glycidyl polyether of this example in xylene is prepared. To this blend is added 79.4 grams of ethyl Cellosolve to obtain a 40 percent resinous solution. A 3 mil film of the resulting solution is prepared and cured by baking at 150° C. for 30 minutes. The cured film is clear and smooth and exhibits exceptional flexibility, toughness, adhesion and hardness.

EXAMPLE 12

*Preparation of glycidyl polyether*

About 1 mol of bisphenol is dissolved in 10 mols of epichlorhydrin and 1 to 2 percent water is added to the resulting mixture. The mixture is then brought to 80° C. and 2 mols of sodium hydroxide added in small portions over a period of about 1 hour. During the addition the temperature of the mixture is held at about 90° C.–110° C. After the sodium hydroxide has been added, the water formed in the reaction and most of the epichlorhydrin is distilled off. The residue is combined with an approximately equal amount of benzene and the mixture is filtered to remove the salt. The benzene is then removed to yield a viscose liquid having an epoxide equivalent of 190.

*Preparation of cured resinous composition*

A resinous composition is prepared from a ratio of 4 hydroxyl equivalents of a polyhydroxy-containing copolymer to 6 anhydride equivalents of polybasic acid anhydride to 3 epoxide equivalents of a glycidyl polyether; which in this case represents, based on a total of 100 parts, 50.6 parts of the 50/50 vinyl toluene/hydroxy propyl acrylate copolymer of Example 7 (hydroxyl equivalent of 260), 21.7 parts of phthalic anhydride and 27.7 parts of the glycidyl polyether of this example (epoxide equivalent of 190). In accordance with the procedure outlined in Example 10, a blend of 109.5 grams of a 46.2 percent solution of the 50/50 vinyl toluene/hydroxy propyl acrylate copolymer of Example 7, 21.7 grams of phthalic anhydride and 36.9 grams of a 75 percent solution of the glycidyl polyether of this example in xylene is made. To the blend is added 81.9 grams of methyl isobutyl ketone to obtain a 40 percent resinous solution. A 3 mil film of this resulting solution is prepared and baked for 30 minutes at 150° C. The cured film is clear and smooth and possesses exceptionally good flexibility, toughness, mar resistance and hardness properties.

EXAMPLE 13

To illustrate some of the ratios of epoxide equivalents to hydroxyl equivalents to anhydride equivalents in the preparation of cured resinous compositions, gel times are given for various ratios of copolymer to anhydride to glycidyl polyether. A long gelation period is indicative of a slow cure. Both the copolymer and the glycidyl polyether of Example 12 are used with phthalic anhydride. All gel times are determined at 120° C.

TABLE—EXAMPLE 13

| Glycidyl Polyether— Epoxide Equivalent | Copolymer— Hydroxyl Equivalents | Anhydride— Anhydride Equivalents | Gel Time (Minutes) |
|---|---|---|---|
| 1.0 | 0.0 | 2.0 | No gel in 660 min. |
| 1.0 | 0.05 | 2.0 | 70 |
| 1.0 | 0.10 | 2.0 | 31 |
| 1.0 | 0.25 | 2.0 | 15 |
| 1.0 | 0.29 | 2.0 | 9 |
| 1.0 | 0.33 | 2.0 | 8 |
| 1.0 | 0.5 | 2.0 | 5 |
| 1.0 | 0.25 | 4.0 | 60 |
| 1.0 | 1.0 | 2.75 | 2 |
| 1.0 | 1.5 | 1.1 | 2 |

EXAMPLE 14

*Preparation of polyhydroxy-containing copolymer*

In accordance with the paragraph preceding these examples, a 50/50 vinyl toluene/hydroxy propyl methacrylate copolymer having a theoretical hydroxyl equivalent of 288 is prepared from a combination of 20.1 parts of propylene oxide, 29.9 parts of methacrylic acid and 50.0 parts of vinyl toluene. Catalysts for the process are 2.0 parts of benzoyl peroxide and 1.0 part of a 60 percent aqueous solution of benzyl trimethyl ammonium chloride, solvent used is 67.0 parts of methyl isobutyl ketone. The resulting copolymer solution has a solids content of 56.7 percent as determined by heating a 2 gram portion in an open container for 2 hours at 150° C., and an acid value of 9.6 based on solids.

*Preparation of cured resinous composition*

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether; which in this example represents, based on a total of 100 parts, 45.2 parts of the 50/50 vinyl toluene/hydroxy propyl methacrylate copolymer of this example (hydroxyl equivalent of 288), 17.4 parts of phthalic anhydride and 37.4 parts of the glycidyl polyether of Example 1 (epoxide equivalent of 318). A resinous composition is prepared in accordance with the procedure in Example 10, by blending 79.7 grams of a 56.7 percent solids solution of the 50/50 vinyl toluene/hydroxy propyl methacrylate copolymer of this example, 17.4 grams of phthalic anhydride and 49.8 grams of the glycidyl polyether of Example 1 as a 75 percent solution in xylene. To adjust the solution to a 40 percent solids content, 103.1 grams of a 50/50 mixture of xylene and methyl isobutyl ketone are added to the blend. A 3 mil film of the resulting resinous solution is prepared and cured by baking at 150° C. for 30 minutes. The cured film is clear and smooth and has outstanding flexibility, hardness, toughness and mar resistance properties.

EXAMPLE 15

*Preparation of polyhydroxy-containing copolymer*

A 50/50 styrene/acrylic acid ester of phenyl glycidyl ether copolymer having a theoretical hydroxyl equivalent of 444 is prepared as described in the paragraph preceding these examples, by the combination of 33.8 parts of phenyl glycidyl ether having a weight per epoxide of 150, 16.2 parts of acrylic acid and 50.0 parts of styrene in the presence of 2.0 parts of benzoyl peroxide and 1.0 part of a 60 percent aqueous solution of benzyl trimethyl ammonium chloride. As solvent for the process, 67.0 parts of methyl isobutyl ketone are used. The resulting copolymer solution has a 60 percent solids content as determined by heating a 2 gram portion in an open container for 2 hours at 150° C., and an acid value of 3.4 based on solids.

*Preparation of cured resinous composition*

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether; which in this example represents, based on a total of 100 parts, 55.9 parts of the 50/50 styrene/acrylic acid ester of phenyl glycidyl ether copolymer (hydroxyl equivalent of 444), of this example, 14.1 parts of phthalic anhydride and 30.0 parts of the glycidyl polyether of Example 1 (epoxide equivalent of 318). In accordance with the procedure outlined in Example 10, a resinous composition is prepared by blending 93.1 grams of the 60 percent copolymer solution of this example, 14.1 grams of phthalic anhydride and 40.0 grams of the glycidyl polyether of Example 1, as a 75 percent solution in xylene. To this blend is added 102.8 grams of a 50/50 mixture of xylene and methyl isobutyl ketone to obtain a 40 percent resinous solution. A 3 mil film of the resulting solution is prepared and cured by baking for 30 minutes at 150° C. The cured film is clear and smooth and is exceptionally tough, hard, mar resistant and flexible.

EXAMPLE 16

*Preparation of polyhydroxy-containing copolymer*

A 65/35 vinyl acetate/hydroxy propyl crotonate copolymer having a theoretical hydroxyl equivalent of 412 is prepared by the reaction of 65.0 parts of vinyl acetate with 20.9 parts of crotonic acid followed by reaction with 14.1 parts of propylene oxide (parts being based on a total of 100 parts for the 3 reactants). In a 1 liter flask equipped with condenser, thermometer and agitator, in the presence of 9.0 grams of benzoyl peroxide, 260.0 grams of vinyl acetate and 83.6 grams of crotonic acid are heated to reflux temperature. The reaction is refluxed until a temperature of 110° C. is reached (approximately 9 hours), adding methyl isobutyl ketone in increments of 62.5 grams to control the viscosity (a total of 250.0 grams). The reaction mixture is cooled to room temperature and an additional 3.0 grams of benzoyl peroxide are added. The reaction is again heated to reflux temperature and maintained there for 2 hours. After cooling to room temperature, 6.7 grams of a 60 percent aqueous solution of benzyl trimethyl ammonium chloride are added, refluxing is continued, and 56.4 grams of propylene oxide are added dropwise by means of a dropping funnel over a period of 3 hours. Refluxing is continued for 4 hours, after which time the volatile material is distilled off by raising the temperature to 115° C. to 117° C. The resulting polyhydroxy-containing copolymer solution thus prepared has a solids content of 60 percent as determined by heating a 2 gram portion in an open container for 2 hours at 150° C. and an acid value of 14 based on solids.

*Preparation of cured resinous composition*

A resinous composition is prepared from a ratio of 4 hydroxyl equivalents of a polyhydroxy-containing copolymer to 6 anhydride equivalents of a polybasic acid anhydride to 3 epoxide equivalents of a glycidyl polyether, which in this example represents, based on a total of 100 parts, 54.2 parts of the 65/35 vinyl acetate/hydroxy propyl crotonate of this example, 14.6 parts of phthalic anhydride and 31.2 parts of the glycidyl ether of Example 1 (epoxide equivalent of 318). In accordance with the procedure outlined in Example 10, a resinous composition is prepared by blending 90.3 grams of a 60 percent solids solution of the 65/35 vinyl acetate/hydroxy propyl crotonate of this example, 14.6 grams of phthalic anhydride and 41.6 grams of a 75 percent solution of the glycidyl polyether of Example 1 in xylene. To adjust the solids content of the solution to 40 percent, 103.5 grams of a 50/50 mixture of xylene and methyl isobutyl ketone are added. A 3 mil film of the resulting blend is prepared and baked for 30 minutes at 150° C. The cured film is clear and smooth and possesses excellent flexibility, hardness, toughness and mar resistance.

EXAMPLE 17

*Preparation of polyhydroxy-containing copolymer*

As outlined in the procedure of Example 16, a 50/50 vinyl acetate/hydroxy propyl crotonate copolymer having a theoretical hydroxyl equivalent of 288 is prepared from 29.8 parts of crotonic acid, 20.2 parts of propylene oxide and 50.0 parts of vinyl acetate. Catalysts for the process are 3.0 parts of benzoyl peroxide and 1.0 part of a 60 percent aqueous solution of benzyl trimethyl ammonium chloride, while 100.0 parts of methyl isobutyl ketone are used as solvent. The resulting copolymer solution has a solids content of 47.8 percent as determined by heating a 2 gram portion in an open container for 2 hours at 150° C., and an acid value of 14 based on solids.

*Preparation of cured resinous composition*

From a ratio of 4 hydroxyl equivalents of a polyhydroxy-containing copolymer to 6 anhydride equivalents of a polybasic acid anhydride to 3 epoxide equivalents of a glycidyl polyether, a resinous composition is prepared. In this example proportions represent, based on a total of 100 parts, 45.2 of the 50/50 vinyl acetate/hydroxy propyl crotonate copolymer of this example, 17.4 parts of phthalic anhydride and 37.4 parts of the glycidyl polyether of Example 1 (epoxide equivalent of 318). A resinous composition is prepared in accordance with the procedure of Example 10, by blending 94.5 grams of the 47.8 percent solids solution of the 50/50 vinyl acetate/hydroxy propyl crotonate copolymer of this example, 17.4 grams of phthalic anhydride and 49.9 grams of the 75 percent solution of the glycidyl polyether of Example 1 in xylene (epoxide equivalent of 318). To this blend are added 88.2 grams of a 50/50 mixture of xylene and methyl isobutyl ketone to obtain a 40 percent resinous solution. A 3 mil film of the resulting solution is prepared and cured by baking at 150° C., for 30 minutes. The cured film is clear and smooth and has excellent hardness, toughness, flexibility and mar resistance properties. This film appears to have slightly better flexibility properties than the film of Example 16.

EXAMPLE 18

*Preparation of polyhydroxy-containing copolymer*

A 30/70 vinyl toluene/hydroxy propyl acrylate copolymer with a theoretical hydroxyl equivalent of 186 is prepared by heating to reflux temperature (77° C. to 78° C.) in a 1 liter, 3 necked flask equipped with an agitator, condenser and thermometer, 30.0 parts of vinyl toluene, 38.7 parts of acrylic acid and 31.3 parts of propylene oxide in the presence of 2.8 parts of benzyl trimethyl ammonium chloride (as a 60 percent aqueous solution) and 2.0 parts of benzoyl peroxide as catalysts and 233.0 parts of methyl isobutyl ketone as solvent for the process. The reaction mixture is refluxed for 30 minutes, whereupon 100.0 parts of cyclohexanol and 100.0 parts of dioxane are added. The mixture is again heated to reflux temperature (90° C.) and heavy refluxing is continued for 9 and a half hours, the reflux temperature rising over that period of time to 108° C. At the completion of the process the resulting copolymer solution has a solids content of 44.6 percent as determined by heating a 2 gram portion in an open container at 150° C., for 2 hours, the acid value of the solids being 1.4.

As in Example 8, gel times are determined for various ratios of copolymer to anhydride to glycidyl polyether, the number of anhydride equivalents in each case being two times the number of epoxide equivalents, and the gelation period being an indication of the practicality of curing compositions using lower ratios of reactants. The glycidyl polyether used in this example is prepared as is the resin of Example 1, but using 4 mols of bisphenol, 5 mols of epichlorhydrin and 6.43 mols of sodium hydroxide to produce a glycidyl polyether with a weight per epoxide of 950. Gel times are as follows:

| Copolymer—Hydroxyl Equivalents | Chlorendic [1]—Anhydride Equivalents | Glycidyl Polyether—Epoxide Equivalents | Temperature, °C. | Gel Time, minutes |
|---|---|---|---|---|
| 1 | 2 | 1 | 131 | 10 |
| 1 | 0.0625 | 0.03125 | 150 | 80 |
| 1 | 0.03125 | 0.015625 | 150 | 300 |

[1] Chlorendic Anhydride is the trademark for 1,4,5,6,7,7-hexachlorobicyclo-(2,2,1)-5-heptene-2,3-dicarboxylic anhydride.

The above examples illustrate that resinous compositions having exceptionally good film properties are prepared by the reaction of polyepoxides, polybasic acid anhydrides and polyhydroxy copolymers. By parts in these examples is meant parts by weight. The invention provides a novel means for producing films having desirable properties of both diepoxides and high molecular weight polymeric compounds. As the examples show, films produced in accordance with this invention exhibit remarkable flexibility, mar resistance, hardness and toughness, as well as exceptionally good chemical resistance. Because of their outstanding heat resistance the cured films of the invention lend themselves to the preparation of high gloss white enamels. Other modifications are also possible. Thus, as indicated all of the carboxy groups in the copolymer need not be esterified. In fact, as illustrated by the following example a partially esterified polymer, a glycidyl polyether and dibasic acid anhydride mixture yields an exceptional film when combined with known urea or melamine aldehyde resins, from five to fifty parts by weight of aldehyde resin based on the total composition generally being used.

EXAMPLE 19

*Preparation of glycidyl polyether*

About 536 parts (2.35 mols) of bisphenol and 211 parts (5.17 mols) of sodium hydroxide (10 percent excess) are combined in 1900 parts of water and heated to about 23° C., whereupon 436 parts (4.70 mols) of epichlorhydrin are added rapidly. The temperature is increased and remains at about 90° C. to 100° C., for 1 hour and 40 minutes. The mixture is separated into a 2 phase system and the aqueous layer drawn off. The resinous layer that remains is washed with hot water and is then drained and dried at a temperature of about 140° C. The Durrans' Mercury Method melting point of the resulting product is 50° C., and the epoxide equivalent is about 327.

*Preparation of cured resinous composition*

The polyhydroxy polymer of Example 7, as a 61 percent solids solution (76.0 parts based on a total of 100 parts) 24.0 parts of phthalic anhydride, representing approximately the amount of anhydride necessary to react with half of the hydroxy groups of the copolymer and 107.0 parts by weight of methyl isobutyl ketone are heated together at 120° C. for a period of 1 hour resulting in a carboxy-hydroxy copolymer 50 percent solids solution with a hydroxyl equivalent of 598 and a carboxyl equivalent of 615. With 24.0 grams of this solution are blended 10.7 grams of a 75 percent solution in xylene of the glycidyl polyether of this example, and 8.3 grams of a butylated urea-formaldehyde resin having a viscosity of S–V (Gardner-Holdt), a solids content of 60 percent (in 87½ percent butyl alcohol and 12½ percent xylene), and a naphtha tolerance of 350. The solids content of the blend is adjusted to 45 percent by the addition of 12.5 grams of xylene. A 3 mil film of the resulting solution is drawn down on a glass plate and is cured by baking for 30 minutes at 150° C. producing an extremely hard film which exhibits excellent adhesion and very good mar resistance.

Another 3 mil film prepared from a blend of 24.0 grams of the carboxy-hydroxy copolymer solution, 10.7 grams of the 75 percent glycidyl polyether solution in xylene, 14.3 grams of the aforedescribed butylated urea-formaldehyde resin solution and 14.5 grams of xylene, after being heated at 150° C. for 30 minutes, exhibits exceptional hardness and adhesion and excellent mar resistance.

From a blend of 24.0 grams of the carboxy-hydroxy copolymer solution with 10.7 grams of the 75 percent solution of glycidyl polyether in xylene, 3.7 grams of the butylated urea-formaldehyde resin solution and 8.7 grams of xylene, a 3 mil film drawn down on a glass plate and baked at 150° C. for 30 minutes yields a flexible film with fair mar resistance.

It is obvious that still other uses and embodiments will occur to those skilled in the art. For example, excellent clear varnishes can be made from the film-formers of this invention. Films produced also have excellent adhesion to metals such as tin and steel. They are particularly suitable, therefore, for coating cans and drums. And, of course, other variations in uses and preparations can be made without departing from the spirit and scope of this invention.

What is claimed is:

1. A process for preparing a resinous composition which comprises reacting (1) a glycidyl polyether of a polyhydric compound of the group consisting of polyhydric phenols and polyhydric alcohols, said polyether containing more than one epoxide group per molecule and having an epoxide equivalent below 1000, (2) a polycarboxylic acid anhydride and (3) a polyhydroxy copolymer which is a reaction product of (a) an alpha, beta ethylenically monounsaturated aliphatic monocarboxylic acid having not more than twelve carbon atoms, (b) an ester-forming compound of the group consisting of dihydric alcohols, alkyl oxiranes, monoglycidyl ethers and monoglycidyl esters, each having not over ten carbon atoms, and (c) an ethylenically unsaturated monomer copolymerizable with the alpha, beta-monocarboxylic acid and selected from the group consisting of monovinyl aromatic hydrocarbons, monovinyl halogenated aromatic hydrocarbons, vinyl alkyl ethers having not more than twenty carbon atoms in the alkyl group, alkenyl cyanides of not over four carbon atoms, monoethylenically unsaturated monocarboxylic acid esters of saturated monohydric alcohols, the acids having not more than four carbon atoms and the alcohols having not more than twenty carbon atoms, and monoethylenically unsaturated monohydric alcohol esters of saturated monocarboxylic acids, the alcohols having not more than four carbon atoms and the acids having not more than twenty carbon atoms, said polyhydroxy copolymer containing 0.5 to 25 percent by weight hydroxyl groups, wherein the anhydride and glycidyl polyether are used in an equivalent ratio of 0.5:1 to 4:1, and the polyhydroxy copolymer is used in an amount of from 5 to 80 percent by weight of the total composition.

2. The process of claim 1 wherein the glycidyl polyether is a glycidyl polyether of a polyhydric phenol, and wherein the polyhydroxy copolymer is a carboxy copolymer of an alpha, beta-monoethylenically monounsaturated aliphatic monocarboxylic acid having not more than twelve carbon atoms and a monovinyl aromatic hydrocarbon, subsequently esterified with the alkyl oxirane to form the hydroxy copolymer.

3. The process of claim 1 wherein the glycidyl polyether is a glycidyl polyether of a dihydric phenol and the polyhydroxy copolymer is the reaction product of a monoethylenically unsaturated monocarboxylic acid ester of a saturated monohydric alcohol and a methacrylic acid half ester of a saturated dihydric alcohol having not more than ten carbon atoms.

4. The process of claim 1 wherein the polyhydroxy copolymer is at least partially reacted with the acid anhydride prior to addition of glycidyl polyether.

5. The process of claim 4 wherein the reaction is carried out in the presence of a ketone as a solvent medium.

6. The process of claim 5 wherein the polyhydroxy copolymer is the reaction product of a monovinyl aromatic hydrocarbon and a polymerizable half ester of acrylic acid and a saturated dihydric alcohol having not more than ten carbon atoms.

7. The process of claim 5 wherein the polyhydroxy copolymer is a styrene-hydroxy propyl acrylate copolymer.

8. The process of claim 5 wherein the polyhydroxy copolymer is a vinyl toluene-hydroxy propyl methacrylate copolymer.

9. The process of claim 5 wherein the glycidyl polyether is substantially the diglycidyl ether of a dihydric phenol having an epoxide equivalent of 140 to 250, wherein the polycarboxylic anhydride is a dicarboxylic acid anhydride, and wherein the polyhydroxy copolymer has a hydroxyl equivalent group of 160 to 1400.

10. A cross-linked, infusible, resinous reaction product resulting from the process of claim 1.

11. A cross-linked, infusible, resinous reaction product resulting from the process of claim 2.

12. A cross-linked, infusible, resinous reaction product resulting from the process of claim 3.

13. A composition containing as its essential constituents (1) a glycidyl polyether of a polyhydric compound of the group consisting of polyhydric phenols and polyhydric alcohols, said polyether containing more than one epoxide per molecule and having an epoxide equivalent below 1000, (2) a polycarboxylic acid anhydride and (3) a polyhydroxy copolymer which is a reaction product of (a) an alpha, beta-ethylenically monounsaturated aliphatic monocarboxylic acid having not more than twelve carbon atoms, (b) an ester-forming compound of the group consisting of dihydric alcohols, alkyl oxiranes, monoglycidyl ethers and monoglycidyl esters, each having not over ten carbon atoms, and (c) an ethylenically unsaturated monomer copolymerizable with the alpha, beta-monocarboxylic acid and selected from the group consisting of monovinyl aromatic hydrocarbons, monovinyl halogenated aromatic hydrocarbons, vinyl alkyl ethers having not more than twenty carbon atoms in the alkyl alkenyl cyanides of not over four carbon atoms, monoethylenically unsaturated monocarboxylic acid esters of saturated monohydric alcohols, the acids having not more than four carbon atoms and the alcohols having not more than twenty carbon atoms, and monoethylenically unsaturated monohydric alcohol esters of saturated monocarboxylic acids, the alcohols having not more than four carbon atoms and the acids having not more than twenty carbon atoms, said polyhydroxy copolymer containing 0.5 to 25 percent by weight hydroxyl groups, wherein the anhydride and glycidyl polyether are present in an equivalent ratio of 0.5:1 to 4:1, and the polyhydroxy copolymer is present in an amount of from 5 to 80 percent by weight of the total composition.

References Cited in the file of this patent

UNITED STATES PATENTS

| 2,512,996 | Bixler | June 27, 1950 |
| 2,713,565 | Howard et al. | July 19, 1955 |
| 2,713,567 | Scheibli | July 19, 1955 |

OTHER REFERENCES

Wakeman: "The Chemistry of Commercial Plastics," pages 379–380, published by Reinhold Pub. Corp., New York, 1947.

Gordon et al.: "Surface Coatings and Finishes," page 168, publshed by Chemical Publishing Co., New York, 1954.

Schildknecht: "Vinyl and Related Polymers," pages 358–359, published by Wiley and Sons, New York, 1952.